(12) United States Patent
Gerber et al.

(10) Patent No.: US 11,247,553 B2
(45) Date of Patent: Feb. 15, 2022

(54) DEVICE FOR CLOSING AN AIR INTAKE OF A MOTOR VEHICLE AND METHOD FOR MANUFACTURING SUCH A CLOSING DEVICE

(71) Applicant: Valeo Systemes Thermiques, Le Mesnil Saint Denis (FR)

(72) Inventors: Sylvain Gerber, Le Mesnil Saint Denis (FR); Enzo Mitidieri, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 50 days.

(21) Appl. No.: 16/630,991

(22) PCT Filed: Jul. 20, 2018

(86) PCT No.: PCT/EP2018/069743
§ 371 (c)(1),
(2) Date: Jan. 14, 2020

(87) PCT Pub. No.: WO2019/020510
PCT Pub. Date: Jan. 31, 2019

(65) Prior Publication Data
US 2020/0223306 A1 Jul. 16, 2020

(30) Foreign Application Priority Data

Jul. 28, 2017 (FR) .................................... 1757188

(51) Int. Cl.
*B60K 11/00* (2006.01)
*B60K 11/08* (2006.01)

(52) U.S. Cl.
CPC ................................. *B60K 11/085* (2013.01)

(58) Field of Classification Search
CPC .................................................. B60K 11/085
(Continued)

(56) References Cited

U.S. PATENT DOCUMENTS 6,179,446 B1 * 1/2001 Sarmadi .................. F21V 29/02
362/264
6,716,003 B2 * 4/2004 Chen ....................... F04B 35/01
417/368

(Continued)

FOREIGN PATENT DOCUMENTS

| DE | 102010002373 A1 | 9/2011 |
| EP | 2641768 A1 | 9/2013 |
| WO | 2012/160065 A1 | 11/2012 |

OTHER PUBLICATIONS

International Search Report and Written Opinion corresponding to International Application No. PCT/EP2018/069743, dated Nov. 6, 2018 (12 pages).

*Primary Examiner* — Hau V Phan
(74) *Attorney, Agent, or Firm* — Osha Bergman Watanabe & Burton LLP (57) ABSTRACT

A device for closing a motor vehicle front end air intake is disclosed. The device has a support frame in which at least one set of pivoting slats is installed. At least one control element that controls the positioning of the slats includes an actuator having fixing holes, a housing that receives the actuator, and a cap that comes to cover the housing. The cooperation between the cap and the housing being effected by clipping. The housing includes positioning elements to be inserted into the fixing holes, and the cap includes at least one specific shape that keeps the actuator fixed relative to the positioning elements when clipping the cap onto the housing.

12 Claims, 4 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 7,546,998 | B2* | 6/2009 | Chen | F04D 19/007 |
| | | | | 248/674 |
| 7,690,607 | B2* | 4/2010 | Garmyn | E06B 9/58 |
| | | | | 248/201 |
| 7,810,466 | B2* | 10/2010 | Preimesberger | F02B 67/10 |
| | | | | 123/195 A |
| 8,827,233 | B2* | 9/2014 | Crane | F24F 13/20 |
| | | | | 248/674 |
| 9,163,852 | B2* | 10/2015 | Crane | B60K 11/085 |
| 10,093,173 | B1* | 10/2018 | Frayer | B60K 11/085 |
| 2010/0243352 | A1* | 9/2010 | Watanabe | B60K 11/085 |
| | | | | 180/68.1 |
| 2010/0253188 | A1* | 10/2010 | Koyama | H05K 5/0073 |
| | | | | 312/223.1 |
| 2011/0121157 | A1* | 5/2011 | Park | F16F 1/3828 |
| | | | | 248/674 |
| 2012/0119059 | A1* | 5/2012 | Crane | F24F 13/20 |
| | | | | 248/674 |
| 2013/0284401 | A1* | 10/2013 | Kiener | B60K 11/085 |
| | | | | 165/98 |
| 2014/0216834 | A1* | 8/2014 | Elliott | B60K 11/085 |
| | | | | 180/68.1 |
| 2014/0342656 | A1 | 11/2014 | Crane et al. | |
| 2017/0001514 | A1* | 1/2017 | Watari | B60K 11/085 |
| 2017/0144710 | A1* | 5/2017 | Frayer | H01Q 1/3233 |
| 2017/0248066 | A1* | 8/2017 | Wolf | F01P 7/10 |
| 2017/0326970 | A1* | 11/2017 | Schoening | B60K 11/085 |
| 2017/0326971 | A1* | 11/2017 | Cosmo | B60K 11/085 |

* cited by examiner

DEVICE FOR CLOSING AN AIR INTAKE OF A MOTOR VEHICLE AND METHOD FOR MANUFACTURING SUCH A CLOSING DEVICE

FIELD OF THE INVENTION

The present invention concerns closing device and to be more precise a device for closing an air intake of a motor vehicle front panel and its method of manufacture.

BACKGROUND OF THE INVENTION

The front panels of motor vehicles are generally made up of two main air intakes, referred to as the high channel and the low channel, separated by a bumper. Generally placed behind this bumper are heat exchangers of the motor vehicle, such as for example that for air conditioning the passenger compartment and/or that for cooling the engine.

It is also known to dispose in the paths of air passing through the main air intakes, and more generally the low channel, a support frame including a multiplicity of slats mounted to pivot about parallel axes and able to assume a multiplicity of different angular positions between an open position and a closing position inclusive, under the control of appropriate control means, thereby forming a closing device similar to a venetian blind. This closing device is sometimes referred to as an active grille shutter or controlled air intake module. A closing device of this kind may also be referred to as an AGS (standing for active grille shutter).

The closing device enables adjustment of the flow rate of air through the air intakes and reaching the heat exchangers. It is therefore possible to optimize the efficacy of those heat exchangers as a function of what is required by varying the quantity of air that they receive. Moreover, the slats in the closing position make it possible to reduce the drag coefficient of the motor vehicle and thus to improve the aerodynamics of said motor vehicle. The closing device therefore makes it possible to reduce energy consumption and pollution if the engine does not need to be cooled by air from the outside.

The closing device conventionally comprises an actuating device (also referred to as an actuator or motor) controlling the slats and enabling opening or closing of the air intake: the slats are open when the engine of the motor vehicle needs to be cooled and the slats are closed when the engine of the motor vehicle is cooled sufficiently.

Known in the prior art are housings on the support frame intended to receive the actuator. However, the actuator is installed in that housing and retained by means of fixing screws. Fixing screws of this kind are additional components of the closing device. Moreover, the use of these fixing screws necessitates a specific assembly step during the manufacture of the closing device, and that specific step therefore increases the time to manufacture this closing device and therefore has a cost. Also, during manufacture of this closing device it is possible to encounter problems linked to the travel of the screws or to screwing in these fixing screws that can lead to manufacturing defects of the closing device necessitating rejection of this closing device. Also, such fixing screws may become detached from the support frame because of vibrations that the closing device may suffer during operation of the motor vehicle for example. This detachment may compromise the correct functioning of the closing device and can damage the actuator.

BRIEF SUMMARY OF THE INVENTION

One of the objectives of the present invention is therefore to remedy at least in part the disadvantages of the prior art set out hereinabove.

Another objective of the present invention, different from the previous objective, is to propose a closing device enabling installation of the actuator without necessitating the use of fixing screws.

Another objective of the present invention, different from the previous objectives, is to propose a method of manufacturing a lower cost closing device.

The present invention therefore concerns a device for closing a motor vehicle front end air intake, comprising:
  a support frame having two lateral uprights interconnected by two edge crossmembers and in which is installed at least one set of slats pivoting between a closing position and an open position,
  at least one control element that controls the positioning of the slats, said at least one control element including at least one control member connected to the slats, an actuator having fixing holes, and a lever connected firstly to the actuator and secondly to the control member so as to enable pivoting of the slats,
  a housing on the support frame that receives the actuator, said housing including an opening, and
  a cover that comes to cover the opening of the housing and that is fixed to the housing,
the housing includes positioning elements intended to be inserted into the fixing holes, each positioning element having a first end connected to the housing and a second end that is a free end and that cooperates with the fixing hole of the actuator, and in that the cap has at least one specific shape that keeps the actuator fixed relative to the first end of the positioning elements when fixing the cap onto the housing.

In other words, the free second end is configured to cooperate with the fixing hole of the actuator, namely the free second end crosses, or passes across, the fixing hole of the actuator. Such cooperation enables better retention of the actuator on the housing.

The cooperation of the positioning elements of the housing with the fixing holes of the actuator enables installation of the actuator in the housing without necessitating the use of fixing screws. Also, the at least one specific shape on the cap enables the actuator to be retained in position in the housing.

The device may further have one or more of the following features, separately or in combination.

In accordance with a first variant, the opening of the housing is on the front face of the support frame and extends perpendicularly to the axis of the edge crossmembers.

In accordance with a second variant, the opening of the housing is on the rear face of the support frame and extends perpendicularly to the axis of the edge crossmembers.

In accordance with an aspect of the first and second variants, the housing is on a lateral upright and extends parallel to the axis of the edge crossmembers.

In accordance with another aspect of these first and second variants, the support frame also has an upright between the two lateral uprights, said upright including the housing.

In accordance with a third variant, the housing is on a lateral upright and extends parallel to the axis of the edge crossmembers.

The positioning elements correspond to fingers having an abutment that serves as a bearing surface for a first surface of the fixing hole of the actuator.

The fingers may be flared in the direction of the first end of the positioning element.

In accordance with a first embodiment, the positioning of the cap over the opening of the housing in order to fix it is effected in a direction parallel to the positioning elements.

The at least one specific shape corresponds to a blind hole that receives the second end of a positioning element, the cap including as many blind holes as the housing has positioning elements.

In accordance with one aspect, the blind holes have a cylindrical shape or elliptical section shape.

The blind hole has a free end cooperating with a second surface of the fixing hole, said second surface being opposite the first surface, so that the first surface of the fixing hole comes into contact with the abutment when the cap is fixed over the opening of the housing.

In accordance with one variant, the free end of the blind holes may have an elastomer material wedge configured to absorb impacts and vibrations.

The cap may optionally have a recess configured to receive a foam intended to come to bear on the actuator when the cap is mounted over the opening of the housing.

In accordance with a second embodiment, the positioning of the cap over the opening of the housing in order to fix it is effected in a direction perpendicular to the positioning elements and preferably perpendicularly to the plane defined by the support frame.

In accordance with the first or the second embodiment, the at least one specific shape corresponds to a rib coming up against an external face of the actuator facing the cap when the cap is mounted over the opening of the housing so as to press the actuator into the housing when fixing the cap over the opening of the housing.

In accordance with one variant, the cap may have hemispherical cheeks intended to come to cover an end part of the slats in order to form a protective barrier enabling limitation of the quantities of dust and debris able to reach this end part of the slats.

The rib is chamfered so as to bear on the actuator to press it into the housing at the end of travel of the cap when clipping the cap over the opening of the housing.

In accordance with one aspect, the rib is on the cap so as to come to press on the center of the actuator when the cap is clipped over the opening of the housing.

In accordance with another aspect, the cap has at least two ribs intended to cooperate with the actuator.

The cap is fixed to the opening of the housing by clipping it thereto.

The present invention also consists in a method of manufacturing a closing device as defined above, and the method comprises the following steps:
- installation of the actuator fitted with the lever in the housing by cooperation of the fixing holes of the actuator with the positioning elements, and
- locking the actuator in the housing by fixing the cap over the opening of the housing.

BRIEF DESCRIPTION OF THE DRAWINGS

Other features and advantages of the present invention will become more clearly apparent on reading the following description given by way of non-limiting illustration and from the appended drawings, in which.

DETAILED DESCRIPTION

In these figures identical elements bear the same reference numbers.

The following embodiments are examples. Although the description refers to one or more embodiments, this does not necessarily mean that each reference concerns the same embodiment or that the features apply only to only one embodiment. Single features of different embodiments may equally be combined or interchanged to produce other embodiments.

The following description refers to first and second surfaces of the fixing holes and to first and second ends of the positioning elements. This is merely a form of indexing to differentiate and designate similar but not identical elements. This indexing does not imply priority of one element with respect to another and such designations may easily be interchanged without departing from the scope of the present invention. Nor does this indexing imply an order in time for example to understand the structure of the closing device or the arrangement or the cooperation of the various elements constituting it.

The following description refers to an orientation as a function of longitudinal and vertical axes defining a height as defined arbitrarily by the trihedron H, L, V represented in particular in FIGS. 1, 2 and 3B to 6D. The choice of names for these axes is not limiting on the orientation that the closing device may assume in its application to a motor vehicle.

Also, in the following description by "front face of the support frame" is meant the part of the support frame first in the flow of air through the closing device in normal operation of the motor vehicle. Likewise, by "rear face of the support frame" is meant the part of the support frame opposite the front face of the support frame.

Figure 1:
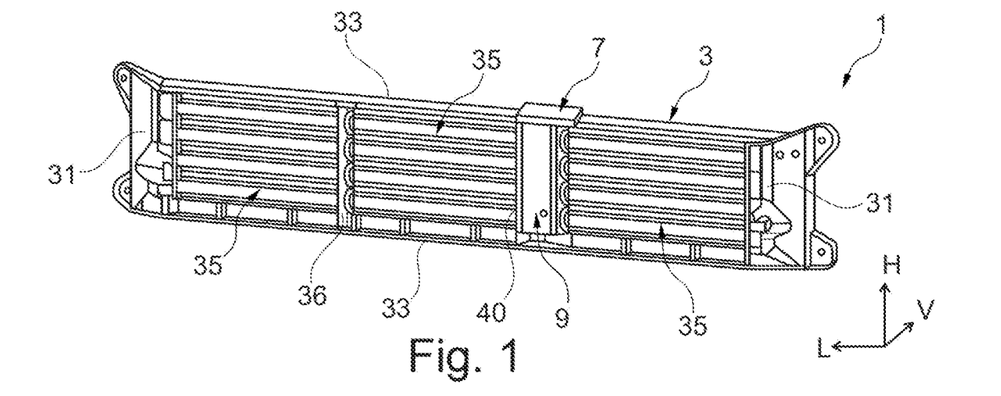
FIG. 1 is a diagrammatic perspective view of a closing device in accordance with a first embodiment.
Figure 2:
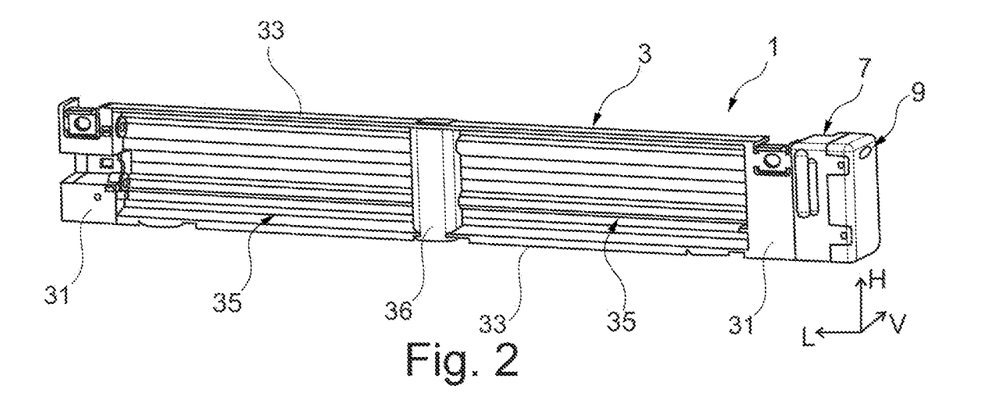
FIG. 2 is a diagrammatic perspective view of a closing device in accordance with a second embodiment.

Referring to FIGS. 1 and 2, there is represented a device 1 in accordance with a first embodiment (FIG. 1) and in accordance with a second embodiment (FIG. 2) for closing a motor vehicle front panel air intake.

The closing device 1 includes a support frame 3. The support frame 3 includes two lateral uprights 31 interconnected by two edge crossmembers 33 defining an opening. Also, the support frame 3 has a front face and a rear face. Also, at least one set of slats 35 is installed in the support frame 3 and more specifically in the opening defined by the lateral uprights 31 and the edge crossmembers 33. The slats constituting the at least one set of slats 35 are installed so as to pivot between a closing position in which they oppose the passage of the flow of air through the closing device 1 and an open position in which they allow the passage of the flow of air through the closing device 1. Moreover, the support frame 3 may optionally have one or more elements 36 reinforcing the slats between the lateral uprights 31 and parallel to those lateral uprights 31. These reinforcing elements 36 are between two sets of slats 35. These reinforcing elements 36 make it possible to prevent flexing of the slats for example because of the pressure the flow of air exerts on them for example. Also, the reinforcing elements 36 may serve to support the slats to enable rotation thereof. Each of the closing devices 1 represented in FIGS. 1 and 2 includes a single reinforcing element 36 but there may be a greater number of reinforcing elements 36.

Also, the closing device 1 includes at least one control element configured to control the positioning of the slats. The at least one control element includes at least one control member (not represented), for example a link, connected to the slats, an actuator 5 (visible in FIGS. 3A and 3B), and a lever (not represented) connected firstly to the actuator 5 and secondly to the control member so as to enable pivoting of the slats of the set of slats 35.

The closing device 1 also includes a housing 7 on the support frame 3. The housing 7 is configured to receive the actuator 5 and the control member. Also, the housing 7 includes an opening covered by a cap 9 (visible in particular in figures SA, 6A and 7A). In accordance with the particular embodiments from FIGS. 1 and 2, the housing 7 is in one piece with the support frame 3. To be more specific the housing 7 is molded with the support frame 3 in order to limit the presence of joints that could form areas of weakness.

Also, the cap 9 is fixed onto the housing 7 by any means known to the person skilled in the art. In accordance with the particular embodiments represented in FIGS. 1 and 2, the cooperation between the cap 9 and the housing 7 is effected by clipping. The fixing of the cap 9 onto the housing 7 by clipping advantageously makes it possible to prevent separation of those elements linked to vibrations during operation of the motor vehicle.

In accordance with the first embodiment represented in FIG. 1, the closing device 1 includes three sets of slats 35 two of which are on respective opposite sides of the control member and therefore of the housing 7. In accordance with this first embodiment the opening of the housing 7 is on the front face of the support frame 3 and the housing 7 extends perpendicularly to the longitudinal axis of the edge crossmembers 33, that is to say along the axis V of the trihedron. To be more precise the housing 7 is installed on an upright 40 between the two lateral uprights 31. The control element can therefore drive the three sets of slats 35 of the closing device 1. The disposition of the housing 7 on the front face advantageously enables use of a weaker system for fixing the cap 9, such as clipping for example, because the latter is pushed onto the support frame 3 by the flow of air when the motor vehicle is operating.

In accordance with a variant of this first embodiment not represented here the opening of the housing 7 may be on a lateral upright 31 of the support frame 3 and the housing 7 extend perpendicularly to the longitudinal axis of the edge crossmembers 33, that is to say along the axis V of the trihedron. In accordance with this variant, the closing device 1 includes only one set of pivoting slats 35.

In accordance with another variant not shown the opening of the housing 7 may be on the rear face of the support frame 3 and the housing 7 extend perpendicularly to the axis of the edge crossmembers 33, that is to say along the axis V of the trihedron. In accordance with this other variant, the housing 7 may be either on the intermediate upright 40 or on a lateral upright 31 of the support frame 3. The closing device 1 in accordance with this other variant may therefore include one or two sets of pivoting slats 35 depending on where the housing 7 is installed.

In accordance with the second embodiment represented in FIG. 2, the opening of the housing 7 is on a lateral upright 31 and the housing 7 extends in line with the edge crossmembers 33, that is to say parallel to the axis L of the trihedron. In accordance with this second embodiment the control element controls only one set of slats 5.

Figure 3A:
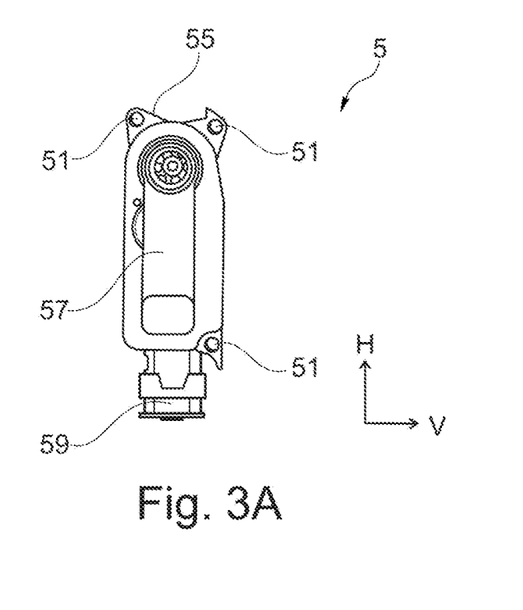
FIG. 3A is a diagrammatic representation of the front of an actuator.
Figure 3B:
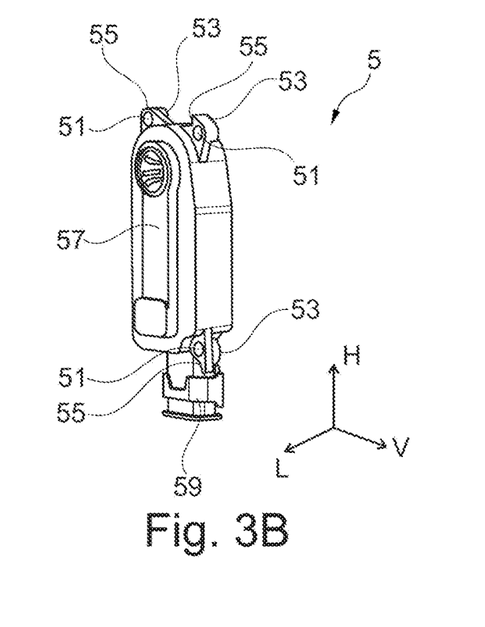
FIG. 3B is a diagrammatic perspective view of the actuator from FIG. 3A.

Referring to FIGS. 3A and 3B, there is represented the actuator 5 intended to be installed in the housing 7 in order to control the set of slats 35. The actuator 5 has fixing holes 51 and more specifically in accordance with this embodiment three fixing holes 51. The presence of three fixing holes 51 enables positioning of the actuator in the housing 7 and also fixed retention thereof in the various directions in space when the cap 9 covers the opening of the housing 7. However, the actuator 5 may include a different number of fixing holes 51, such as for example two, four or more. The fixing holes 51 have a first surface 53 intended to be positioned facing the housing 7 when the actuator 5 is installed on the support frame 3 and a second surface 55 opposite the first surface 53. Also, the actuator 5 has an external face 57 intended to face the cap 9 when that cap covers the opening of the housing 7. Also, the actuator 5 also has a connecting plug 59 intended to be connected to a control unit (not represented) enabling the supply of electrical power to the actuator 5 for control of the positioning of the slats when the motor vehicle is operating, for example according to the necessity to cool the engine.

Referring to FIGS. 4A to 7C, there are represented in more detail the housing 7 (in particular in FIGS. 4A, 4B, 6B and 7B) and the cap 9 (in particular in FIGS. 5B, 6C and 7C), together with the cooperation of the actuator 5 with the housing 7 (in FIGS. 4B, 6B, and 7B) in accordance with different particular embodiments.

The housing 7 includes positioning elements 73 intended to be inserted in the fixing holes 51 of the actuator. 5 These positioning elements 73 therefore enable centering of the actuator 5 inside the housing 7 and immobilization of that actuator 5 along the axes V and H of the trihedron. Each positioning element 73 has a first end 73a connected to the housing 7 and a second end 73b that is a free end configured to cooperate with the fixing hole 51. More specifically, in these embodiments the positioning elements 73 correspond to fingers including an abutment 75, shown in FIG. 4A in particular, configured to serve as a bearing surface for the first surface 53 of the fixing hole 51. The first surface 53 of the fixing hole 51 faces the first end 73a of the positioning element 73 as shown in FIGS. 4B, 6B and 7B. In accordance with these particular embodiments, the fingers are flared in the direction of the first end 73a of the positioning element 73. The presence of these positioning elements 73 advantageously makes it possible to dispense with the use of fixing screws in order to enable installation of the actuator 5 in the housing 7 when the opening of the housing 7 is covered by the cap 9. Also, the positioning elements 73 can absorb the torque of the actuator 5 when the latter pivots the slats of the set of slats 35.

The cap 9 (visible in FIGS. 5B, 6C and 7C) has at least one specific shape 93, 97 configured to hold the actuator 5 fixed in position relative to the first ends 73*a* of the positioning elements 73 when fixing the cap 9 onto the housing 7, and more particularly when clipping the cap 9 in accordance with the different embodiments represented here. When clipping the cap 9 onto the housing the actuator 5 is therefore held against the abutments 75, and to be more precise the first surface 53 of the fixing holes 51, and movement thereof in the different directions in space can be prevented, which makes it possible for the actuator 5 to be retained in a fixed position without necessitating the use of fixing screws.

Referring to FIGS. 4A to 5B, there is represented a first variant of the closing device 1. In accordance with this first variant, the clipping of the cap 9 over the opening of the housing 7 is effected in a direction parallel to the positioning elements 73 and more particularly along the axis L of the trihedron. Also, the actuator 5 is on a lateral upright 31 of the support frame 3 and drives pivoting of only one set of slats 35; the closing device 1 therefore corresponds to the closing device 1 represented in FIG. 2.

Figure 4A:
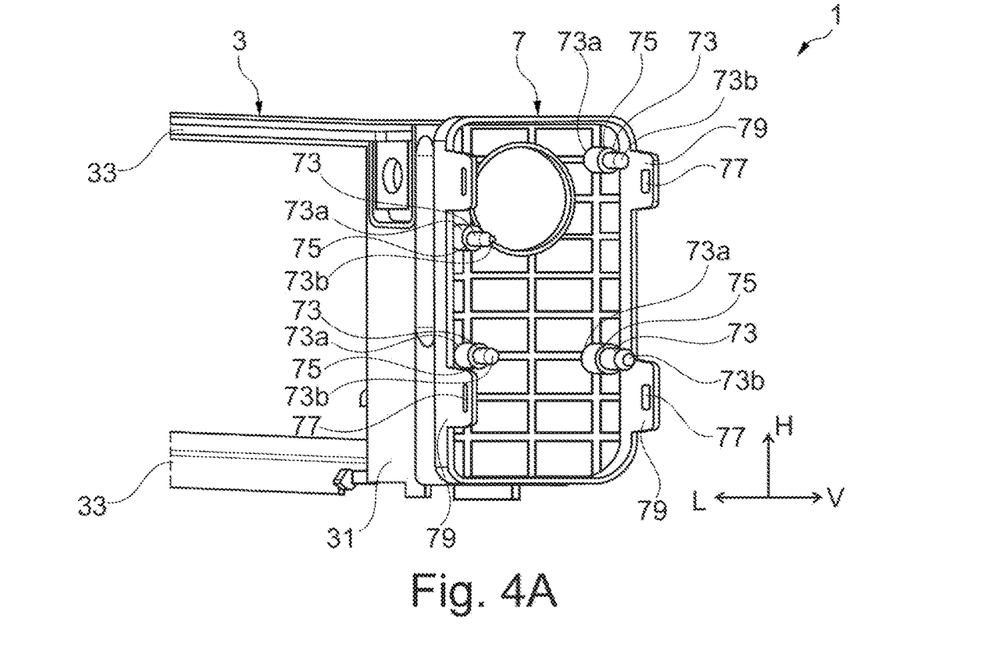
FIG. 4A is a diagrammatic perspective view of a housing of the closing device.
Figure 4B:
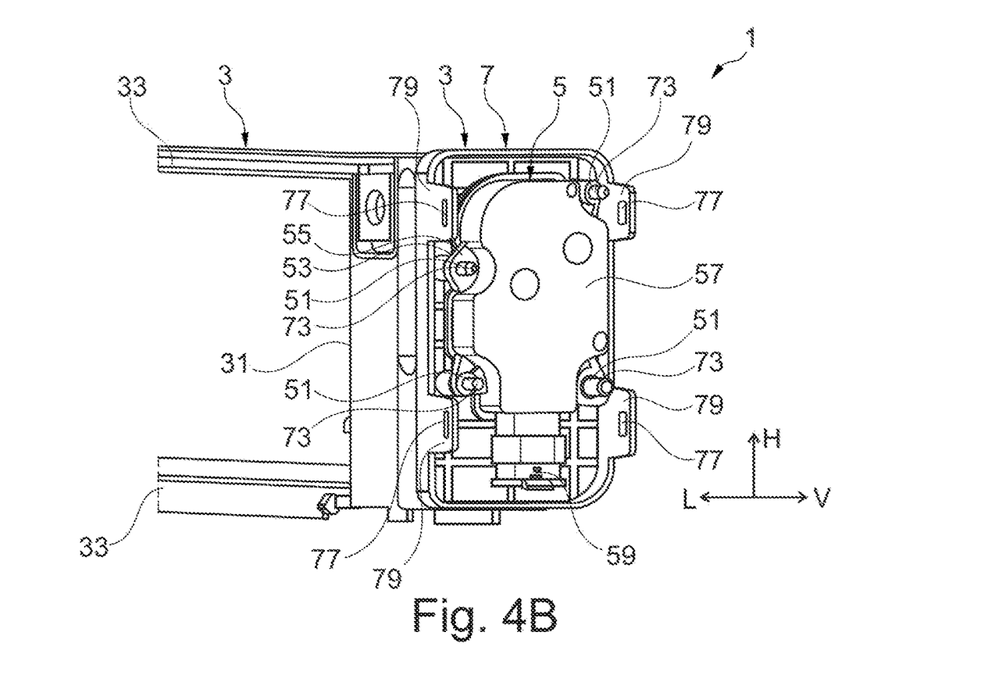
FIG. 4B is a diagrammatic representation of the housing from FIG. 4A housing an actuator.

Referring to FIG. 4A, the housing 7 has four elements 73 for locating the actuator. Thus in accordance with this particular embodiment the actuator 5 includes four fixing holes 51 intended to cooperate with these four positioning elements 73 as represented in FIG. 4B. The presence of the four positioning elements 73 enables centering of the actuator 5 and prevention of movement thereof in the different directions in space. Also, the torque of the actuator 5 may be distributed over the different positioning elements 73, which enables prevention of possible fatigue of the positioning elements 73 that may create weakness, or even to these positioning elements 73 breaking.

Referring to FIGS. 4A to 5B, the housing 7 includes openings 77 intended to cooperate with complementary shapes 100 on the cap 9 in order to enable cooperation of the cap 9 with the housing 7 by clipping and therefore fixing of the cap 9 over the opening of the housing 7. The openings 77 are on fixing lugs 79 extending in line with the opening housing the actuator 5. For its part the cap 9 has the complementary shapes 100 (visible in FIG. 5B) at its periphery. To be more precise the housing 7 includes four fixing lugs 79 extending parallel to the longitudinal axis of the edge crossmembers 33, that is to say parallel to the axis L of the trihedron. Secondly, the fixing lugs 79 are disposed along the height of the support frame 3, that is to say along the axis H of the trihedron. For their part the complementary shapes 100 are on lateral walls 101 of the cap 9.

Figure 5A:
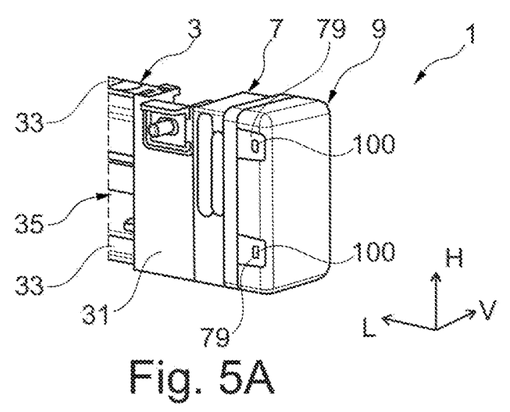
FIG. 5A is a diagrammatic partial perspective view of the closing device from FIG. 2 in accordance with a first variant.
Figure 5B:
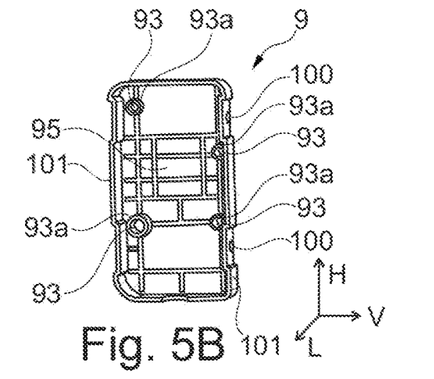
FIG. 5B is a diagrammatic perspective view of a cap of the closing device from FIG. 4A.

Referring to FIG. 5B, at least one specific shape corresponds to a blind hole 93 configure to receive the second end 73*b* of a positioning element 73. In accordance with the particular embodiment represented here, the cap 9 includes four blind holes 93 intended to cooperate with the four positioning elements 73.

In accordance with other embodiments not represented here, the cap 9 may have a different number of blind holes 93. More generally, the cap 9 includes as many blind holes 93 as the housing 7 has positioning elements 73. In fact, the cooperation of the blind holes 93 with the positioning elements 73 enables centering of the cap 9 over the opening of the housing 7 and also fixed retention of the actuator 5 in the housing 7.

Also, in accordance with the particular embodiment from FIG. 5B, the blind holes 93 may have a cylindrical shape or elliptical section shape intended to receive at least the second ends 73*b* of the positioning elements 73. In accordance with this first variant, each blind hole 93 has a free end 93*a* cooperating with the second surface 55 of the fixing hole 51 so that the first surface 53 of the fixing hole 51 comes into contact with the abutment 75 when the cap 9 is clipped over the opening, thereby enabling the actuator 5 to be fixedly retained inside the housing 7. In order to limit fatigue of the positioning elements 73 the free end 93*a* of the blind holes 93 may optionally include an elastomer material wedge for example configured to absorb impacts and vibrations to which the closing device 1 may be subjected during operation of the motor vehicle.

As represented in FIG. 5B, the cap 9 may optionally include a recess 95 configured to receive a foam intended to come to bear on the external face 57 of the actuator 5 when the cap 9 is mounted over the opening of the housing 7. The presence of this foam in the cap 9 makes it possible to strengthen the retention of the actuator 5 in position inside the housing 7 because this foam pushes the actuator 5 against the abutments 75 carried by the positioning elements 73. In accordance with an embodiment not represented here, the actuator 5 may be retained in place inside the housing 7 directly by the foam. The presence of the blind holes 93 may therefore not be necessary.

In accordance with an alternative not represented here, the at least one specific shape may instead or in addition correspond to a rib coming to bear on the external face 57 of the actuator 5 when the cap 9 is mounted over the opening of the housing 7 so as to press the actuator 5 into the housing 7 when the cap 9 is clipped onto the housing 7.

Secondly, referring to FIG. 5A, the housing 7 and the cap 9 in the assembled state have a notch (not represented) in order to enable the passage of a connecting cable (not represented) enabling connection of the connecting plug 59 of the actuator 5 to the control unit.

In accordance with another embodiment not represented here, this first variant may be used in the closing device 1 from FIG. 1, that is to say when the housing 7 extends perpendicularly to the longitudinal axis of the edge crossmembers 33, and thus along the axis V of the trihedron. In accordance with this other embodiment, the housing 7 may be either on a lateral upright 31 or on an upright 40 between the two two lateral uprights 31. Also, the housing 7 may be on the front face or on the rear face of the support frame 3.

Referring to FIGS. 6A to 7C, there are represented a second variant (FIGS. 6A to 6C) and a third variant (FIGS. 7A to 7C) of the closing device 1. In accordance with these second and third variants the opening of the housing 7 is in line with the edge crossmembers 33 and extends along the axes L and V of the trihedron. In accordance with these second and third variants the cap 9 has an extension 10 extending parallel to the longitudinal axis of the edge crossmembers 33 when the cap 9 is fixed onto the housing 7. The extension 10 is intended to come into contact with bearings enabling fixing of the at least one set of slats 35.

In accordance with these second and third variants the actuator 5 is on a lateral upright 31 of the support frame 3. Secondly, the cap 9 is clipped over the opening of the housing 7 in a direction perpendicular to the positioning elements 73 and preferably perpendicularly to the plane defined by the support frame 3, that is to say along the axis V of the trihedron.

Figure 6A:
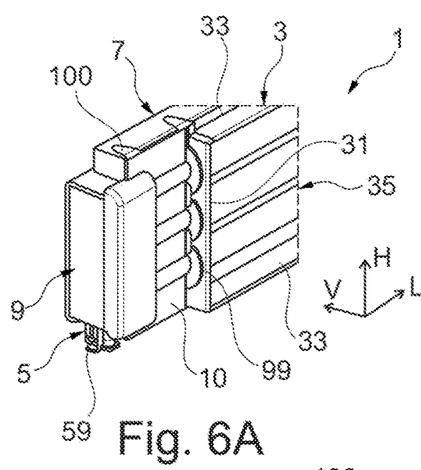
FIG. 6A is a diagrammatic partial perspective view of a closing device in accordance with a second variant.
Figure 6B:
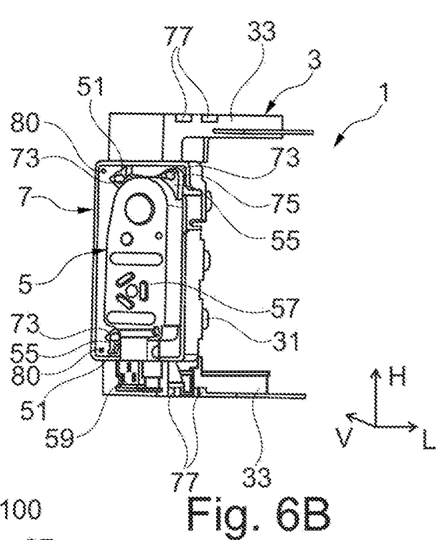
FIG. 6B is a diagrammatic perspective view of a housing of the closing device from FIG. 6A housing an actuator.
Figure 7A:
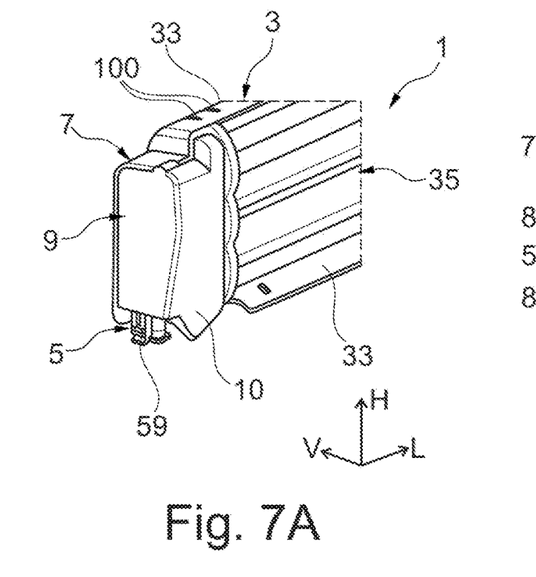
FIG. 7A is a diagrammatic partial perspective view of a closing device in accordance with a third variant.
Figure 7B:
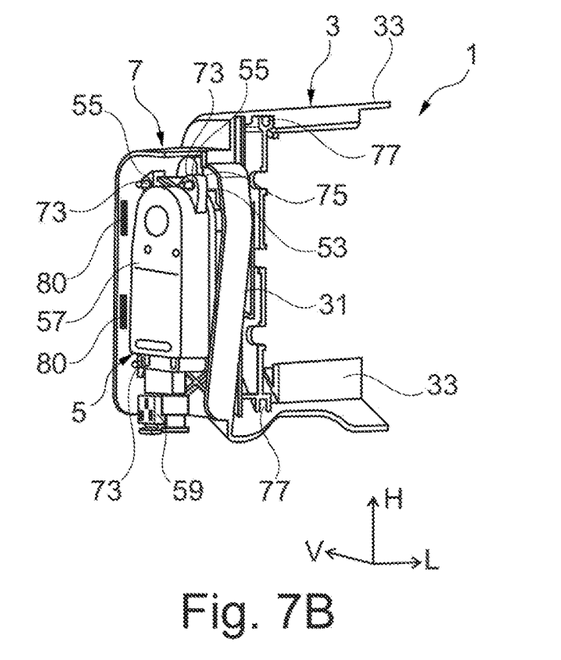
FIG. 7B is a diagrammatic perspective view of a housing of the closing device from FIG. 7A housing an actuator.

Referring to FIGS. 6A and 7A, the connecting plug 59 of the actuator 5 projects from the housing 7 and from the cap 9 in the assembled state of those two elements in order to enable connection of the actuator 5 to the control unit.

With reference to FIGS. 6B and 7B, the housing 7 includes three positioning elements 73 each including an abutment 75. Secondly, the actuator 5 includes three fixing holes 51 cooperating with the positioning elements 73.

The housing 7 also includes openings 77 configured to cooperate with the complementary shapes 100 carried by the extension 10 of the cap 9 (visible in FIGS. 6C and 7C) in order to fix the cap 9 onto the housing 7 by clipping it thereto. Also, the housing 7 optionally includes openings 80 for locating the cap 9. The locating openings 80 are intended to cooperate with positioning members 103 on the cap 9 in order to guide the cap 9 so as to facilitate clipping it onto the housing 7 and to strengthen its cooperation with the housing 7.

Figure 6C:
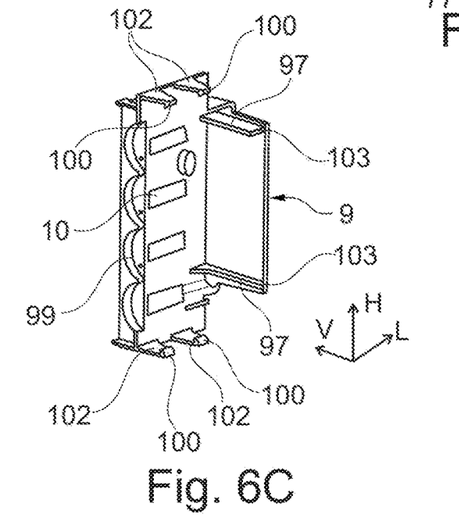
FIG. 6C is a diagrammatic perspective view of a cap of the closing device from figure SA.
Figure 7C:
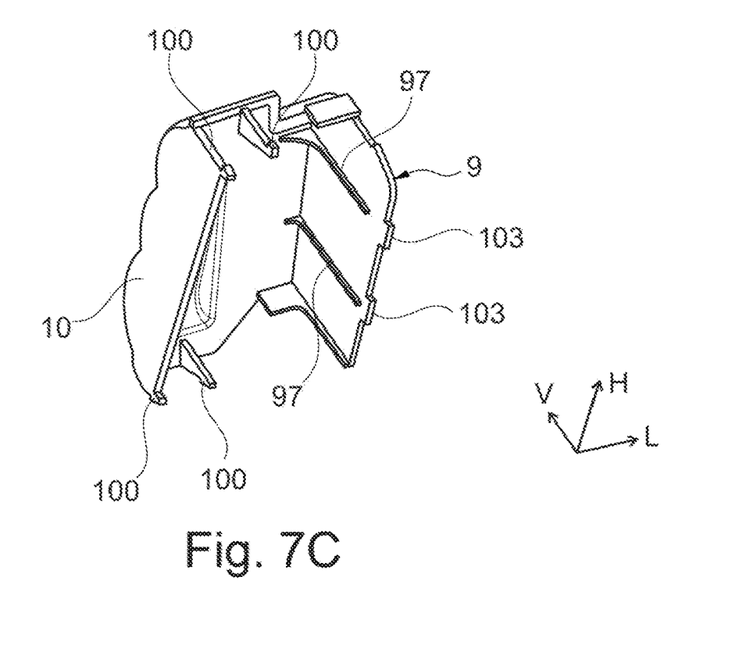
FIG. 7C is a diagrammatic perspective view of a cap of the closing device from FIG. 7A.

Referring to FIGS. 6C and 7C, the at least one specific shape corresponds to a rib 97 coming up against the external face 57 of the actuator 5 facing the cap 9 when the cap 9 is mounted over the opening of the housing 7 so as to press the actuator 5 into the housing 7 when clipping on the cap 9. In accordance with the particular embodiments represented here, the cap 9 includes two ribs 97 intended to cooperate with the actuator 5 in order to press the latter into the housing 7. In accordance with these particular embodiments, the ribs 97 are on the cap 9 so as to come to press on an upper part of the actuator 5 in the case of the one of the ribs 97 and on a lower part of the actuator 5 in the case of the other rib 97. In accordance with an alternative not represented here, the cap 9 may include a single rib 97 on the cap 9 so as to come to press on the middle of the actuator 5 when clipping the cap 9 over the opening of the housing 7.

In accordance with the second variant represented in FIGS. 6A to 6C, the housing 7 includes two openings 77 on each edge crossmember 33 intended to cooperate with the complementary shapes 100 carried by the extension 10 of the cap 9. In accordance with the particular embodiment from FIG. 6C, the complementary shapes 100 are on arms 102. The disposition of the cap 9 on the front face of the support frame 3 advantageously enables easy access to that cap 9 and can enable rapid demounting of the cap 9 enabling for example rapid replacement of the actuator 5 if necessary. Also, the flow of air when the motor vehicle is operating can press the cap 9 against the support frame 3 and more particularly onto the housing 7, thereby preventing possible separation of the cap 9 and the housing 7.

In accordance with this second variant, and referring to FIG. 6C, the ribs 97 are plane. The actuator 5 is therefore pressed against the abutments 75 carried by the positioning elements 73 before the cap 9 is clipped onto the housing 7.

Referring to FIG. 6C, the extension 10 of the cap 9 optionally includes hemispherical cheeks 99, also referred to as clamps, intended to come to cover an end part of the slats in order to form a protective barrier enabling limitation of the quantities of dust and debris that may reach this end part of the slats. The presence of these cheeks 99 advantageously makes it possible to prevent certain malfunctions of the closing device 1 by preventing the deposition of dust at the level of the ends of the slats, enabling pivoting of the latter.

In accordance with the third variant represented in FIGS. 7A to 7C, the ribs 97 (visible in FIG. 7C) are chamfered so as to press on the actuator 5 to press it into the housing 7 at the end of travel of the cap 9 when the cap 9 and its extension 10 are clipped over the opening of the housing 7. This kind of shape of the ribs 97 advantageously enables limitation of the forces exerted on the positioning elements 73 when positioning the cap 9 over the opening of the housing 7. In fact, in a configuration of this kind, the cap 9, and to be more precise at least one rib 97 corresponding to the specific shape, is in contact with the actuator 5 only when it is clipped into the housing 7.

Also, in accordance with this third variant, the actuator 5 is on the rear face of the support frame 3. In order to strengthen the cooperation of the cap 9 with the housing 7, the complementary shapes 100 carried by the cap 9 can be produced in a hyper-rigid material. The clipping of the cap 9 onto the housing 7 is therefore effected by exploiting the flexibility of the support frame 3, which makes it possible to increase the wind resistance of the assembly composed of the cap 9 and of the housing 7. This improvement of the wind resistance advantageously enables positioning of the housing 7, and therefore the actuator 5, on the rear side of a support frame 3.

In accordance with an alternative not shown of this third variant, the housing 7 may be on the front face of the support frame 3.

The present invention also consists in a method for manufacturing the closing device 1 described with reference to FIGS. 1 to 7C. The support frame 3 is generally injection molded. As stated above, the housing 7 is molded with the support frame 3 in order to limit zones of weakness formed by joints.

The method includes a step of installing the actuator 5 fitted with the lever in the housing 7. This installation step is effected by cooperation of the fixing holes 51 of the actuator 5 with the positioning elements 73. The lever is then connected to the control member in order to form the control element enabling the slats to be pivoted between their open position and their closing position.

The method thereafter includes a step of installation of the slats composing the at least one set of slats 35 inside the support frame 3.

The method thereafter employs a step of connecting those slats to the control member in order to enable them to be pivoted between their closing position and their open position by the actuator 5.

The method thereafter includes a step of locking the actuator 5 into the housing 7 by fixing the cap 9 over the opening of the housing 7 by clipping it thereto.

The embodiments set out hereinabove are examples provided by way of nonlimiting illustration. In fact, it is entirely possible for the person skilled in the art to modify the number of fixing holes 51 of the actuator 5 and the number of positioning elements 73 in the housing 7 without departing from the scope of the present invention. The person skilled in the art could then use any method of manufacturing the support frame 3 other than injection molding, such as for example 3D printing, without departing from the scope of the present invention.

Obtaining a closing device 1 the cost and the manufacturing time of which are improved is therefore possible thanks to the closing device 1 in which the actuator 5 is fixedly retained inside the housing 7 by the positioning elements 73 and clipping on the cap 9, thus making it possible as described above to dispense with the use of fixing screws for fixed retention of the actuator 5 inside the housing 7.

The invention claimed is:

1. A device for closing a motor vehicle front end air intake, comprising:
   a support frame having two lateral uprights interconnected by two edge crossmembers, wherein at least one set of slats pivoting between a closing position and an open position is installed in the support frame;
   at least one control element that controls the positioning of the slats, said at least one control element including at least one control member connected to the slats, an actuator having fixing holes, and a lever connected firstly to the actuator and secondly to the control member so as to enable pivoting of the slats;
   a housing on the support frame that receives the actuator, said housing having an opening; and
   a cap that comes to cover the opening of the housing and that is fixed to the housing,
   wherein the housing includes positioning elements configured to be inserted into the fixing holes, each positioning element having a first end connected to the housing and a second end that is a free end and that cooperates with the fixing hole of the actuator, and
   wherein the cap has at least one specific shape that keeps the actuator fixed relative to the first end of the positioning elements when fixing the cap onto the housing, and the at least one specific shape is a blind hole or a rib.

2. The closing device as claimed in claim 1, wherein the opening of the housing is on the front face of the support frame and extends perpendicularly to the axis of the edge crossmembers or to the rear face of the support frame and extends perpendicularly to the axis of the end frame.

3. The closing device as claimed in claim 1, wherein the housing is on a lateral upright and extends parallel to the axis of the edge crossmembers.

4. The closing device as claimed in claim 1, wherein the positioning elements correspond to fingers having an abutment that serves as a bearing surface for a first surface of the fixing hole of the actuator.

5. The closing device as claimed in claim 4, wherein the positioning of the cap over the opening of the housing in order to fix it is effected in a direction parallel to the positioning elements.

6. The closing device as claimed in claim 5, wherein the at least one specific shape corresponds to a blind hole that receives the second end of a positioning element, the cap including as many blind holes as the housing has positioning elements.

7. The closing device as claimed in claim 6, wherein the blind hole has a free end cooperating with a second surface of the fixing hole, said second surface being opposite the first surface, so that the first surface of the fixing hole comes into contact with the abutment when the cap is fixed over the opening of the housing.

8. The closing device as claimed in claim 5, wherein the at least one specific shape corresponds to a rib coming up against an external face of the actuator facing the cap when the cap is mounted over the opening of the housing so as to press the actuator into the housing when fixing the cap over the opening of the housing.

9. The closing device as claimed in claim 4, wherein the fingers are flared in the direction of the first end of the positioning element.

10. The closing device as claimed in claim 1, wherein the positioning of the cap over the opening of the housing in order to fix the cap is effected in a direction perpendicular to the positioning elements and perpendicularly to the plane defined by the support frame.

11. A method of manufacturing a closing device, comprising:
    installing an actuator fitted with a lever in a housing by cooperation of fixing holes of the actuator with positioning elements, wherein the closing device comprises:
       a support frame having two lateral uprights interconnected by two edge crossmembers, wherein at least one set of slats pivoting between a closing position and an open position is installed in the support frame,
       at least one control element that controls the positioning of the slats, said at least one control element including at least one control member connected to the slats, the actuator having the fixing holes, and the lever connected to the actuator and to the control member so as to enable pivoting of the slats,
       the housing on the support frame that receives the actuator, said housing having an opening and the positioning elements configured to be inserted into the fixing holes, each positioning element having a first end connected to the housing and a second end that is a free end and that cooperates with the fixing hole of the actuator, and
       a cap that comes to cover the opening of the housing and that is fixed to the housing,
       wherein the cap has at least one specific shape that keeps the actuator fixed relative to the first end of the positioning elements when fixing the cap onto the housing and the at least one specific shape is a blind hole or a rib; and
    locking the actuator in the housing by fixing the cap over the opening of the housing.

12. A device for closing a motor vehicle front end air intake, comprising:
    a support frame having two lateral uprights interconnected by two edge crossmembers, wherein at least one set of slats pivoting between a closing position and an open position is installed in the support frame,
    at least one control element that controls the positioning of the slats, said at least one control element including at least one control member connected to the slats, an actuator having fixing holes, and a lever connected to an actuator and to the control member so as to enable pivoting of the slats,
    a housing on the support frame that receives the actuator, said housing having an opening and a positioning elements configured to be inserted into the fixing holes, each positioning element having a first end connected to the housing and a second end that is a free end and that cooperates with the fixing hole of the actuator, and
    a cap that comes to cover the opening of the housing and that is fixed to the housing,
    wherein the cap has at least one specific shape that keeps the actuator fixed relative to the first end of the positioning elements when fixing the cap onto the housing and the at least one specific shape is a blind hole or a rib, and
    wherein cooperation of the positioning elements of the housing with the fixing holes of the actuator enables installation of the actuator in the housing without necessitating the use of fixing screws.

* * * * *